United States Patent
Han et al.

(10) Patent No.: US 10,020,529 B2
(45) Date of Patent: Jul. 10, 2018

(54) FLOW BATTERY STACK INCLUDING CAPILLARY TUBE

(71) Applicant: H2, Inc., Daejeon (KR)

(72) Inventors: Shin Han, Daejeon (KR); Yujong Kim, Daejeon (KR); Dongwan Seo, Daejeon (KR)

(73) Assignee: H2, Inc., Daejeon (KR)

( * ) Notice: Subject to any disclaimer, the term of this patent is extended or adjusted under 35 U.S.C. 154(b) by 0 days.

(21) Appl. No.: 15/785,976

(22) Filed: Oct. 17, 2017

(65) Prior Publication Data

US 2018/0115009 A1 Apr. 26, 2018

(30) Foreign Application Priority Data

Oct. 20, 2016 (KR) .................. 10-2016-0136229

(51) Int. Cl.
*H01M 2/38* (2006.01)
*H01M 8/2465* (2016.01)
*H01M 8/18* (2006.01)

(52) U.S. Cl.
CPC ......... *H01M 8/2465* (2013.01); *H01M 8/188* (2013.01)

(58) Field of Classification Search
CPC .......................... H01M 8/2465; H01M 8/188

USPC ......................................................... 429/51
See application file for complete search history.

(56) References Cited

U.S. PATENT DOCUMENTS

| 8,293,390 B2 | 10/2012 | Winter | |
|---|---|---|---|
| 2005/0277016 A1* | 12/2005 | Gestermann | C25B 9/08 429/51 |
| 2011/0206960 A1* | 8/2011 | Winter | B29C 33/76 429/70 |
| 2016/0254553 A1 | 9/2016 | Winter et al. | |

FOREIGN PATENT DOCUMENTS

| JP | 2001-155758 A | 6/2001 |
|---|---|---|
| KR | 101431070 A | 8/2014 |
| KR | 101471886 A | 12/2014 |

\* cited by examiner

*Primary Examiner* — Gary Harris
(74) *Attorney, Agent, or Firm* — Cowan, Liebowitz & Latman P.C.

(57) ABSTRACT

The present invention relates to a redox flow battery stack including: an ion exchange membrane 180; and flow frames 160A and 160B disposed at both sides of the ion exchange membrane 180, respectively, in which semicircular grooves are provided on the flow frames 160A and 160B, and the semicircular grooves 161A and 162A of the flow frame 160A are fitted with the semicircular grooves 161B and 162B of the corresponding flow frame 160B during assembly to form at least one of an inlet port and an outlet port.

10 Claims, 6 Drawing Sheets

[FIG. 1]
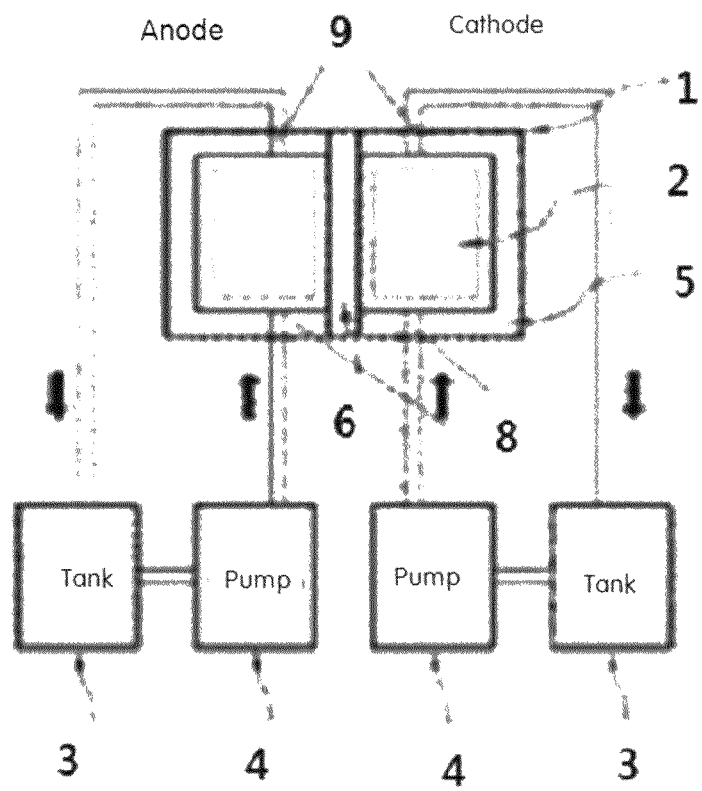
[FIG. 2]
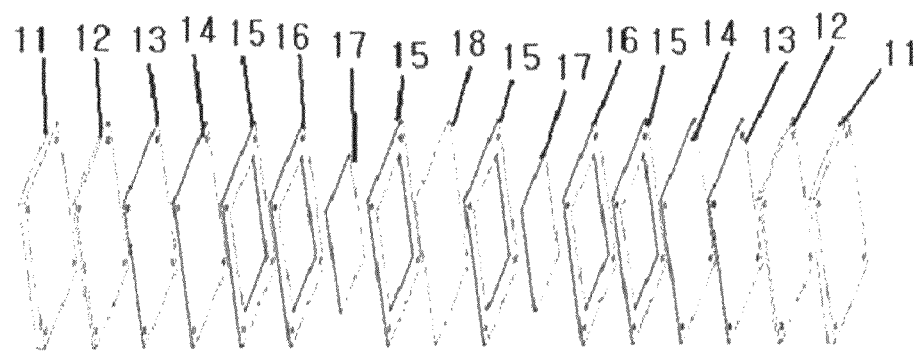

[FIG. 3a]
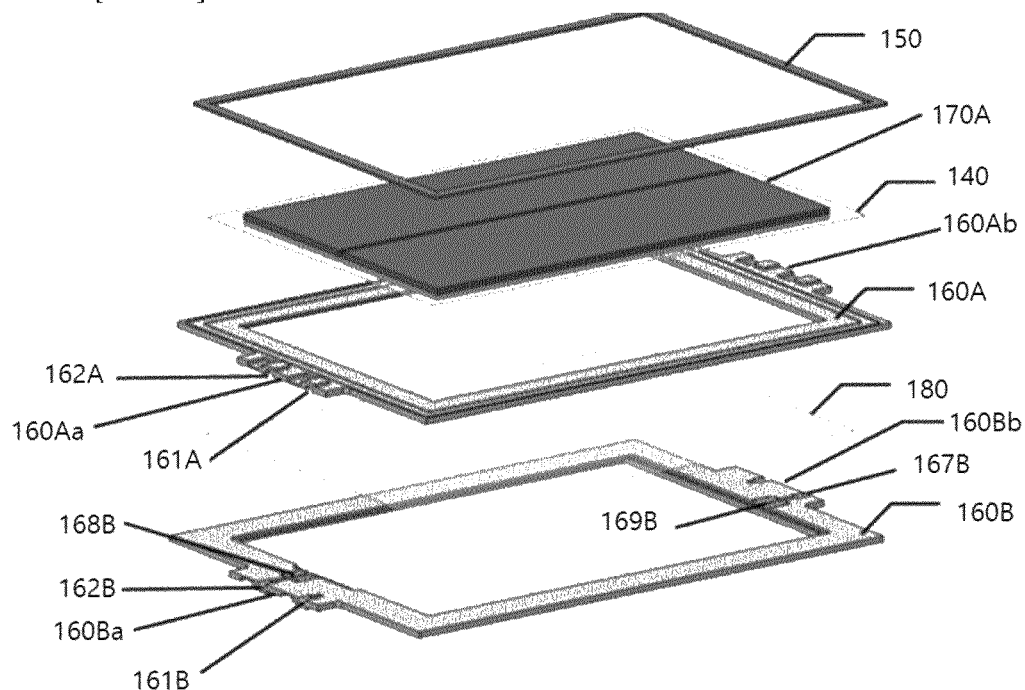
[FIG. 3b]
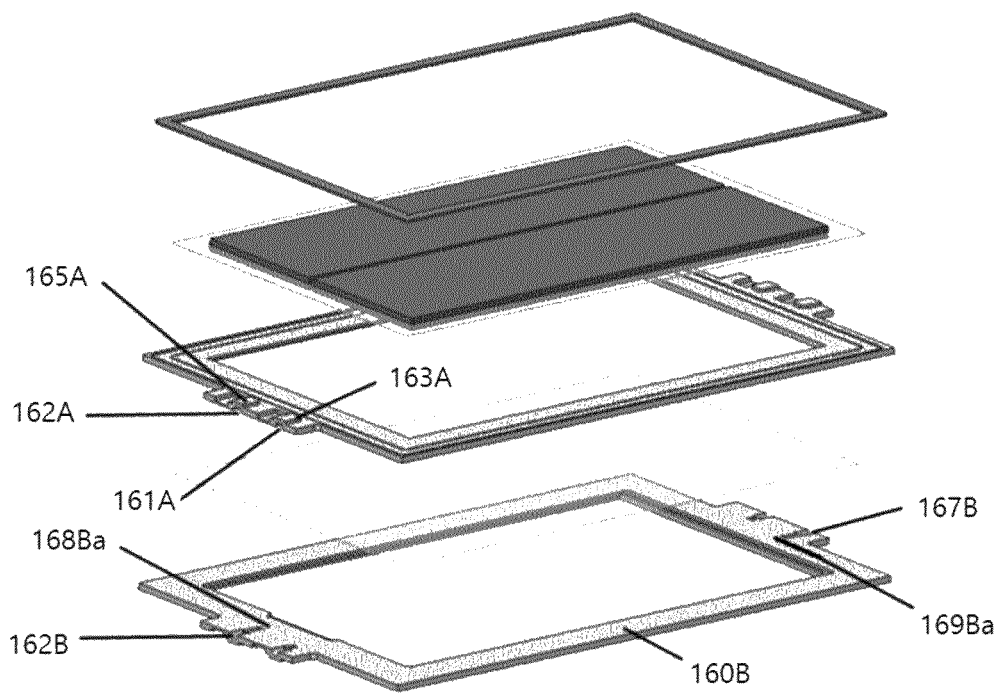

[FIG. 4a]
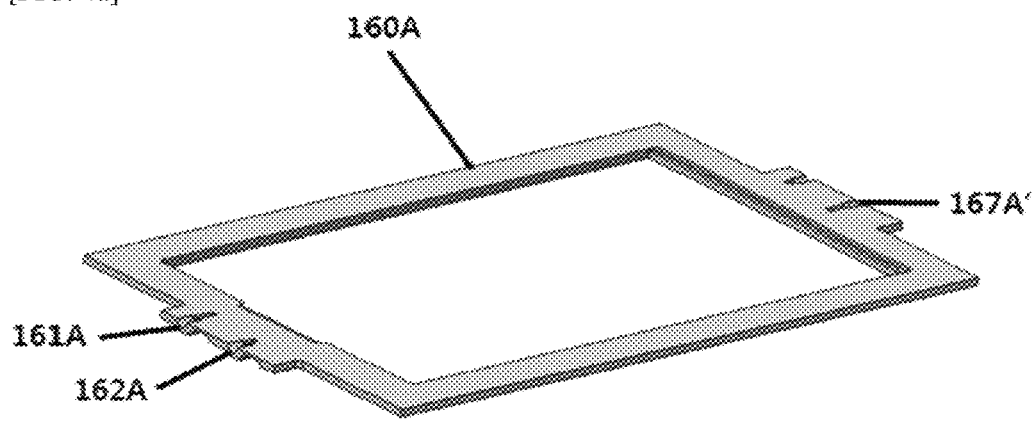
[FIG. 4b]
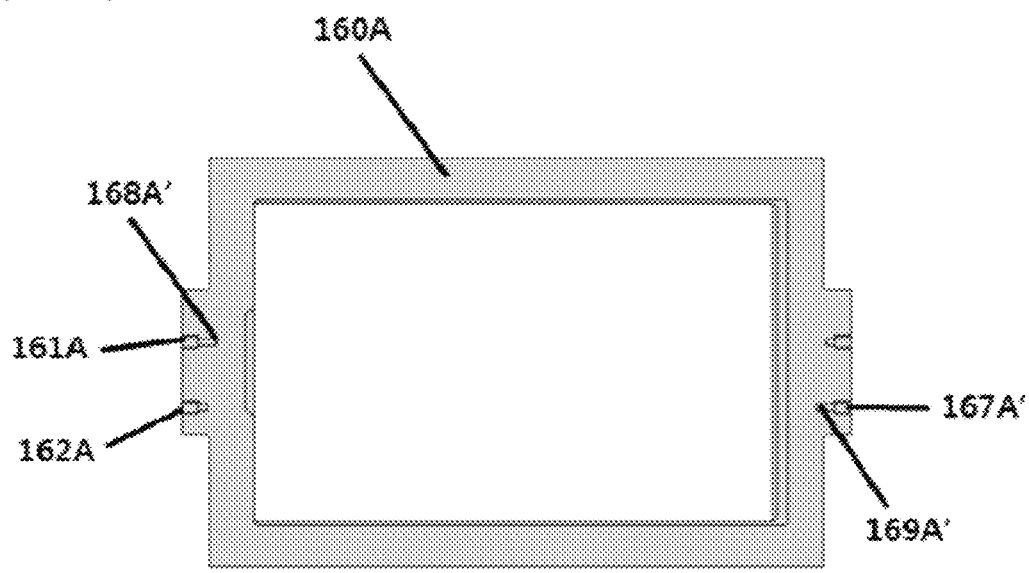

[FIG. 4c]
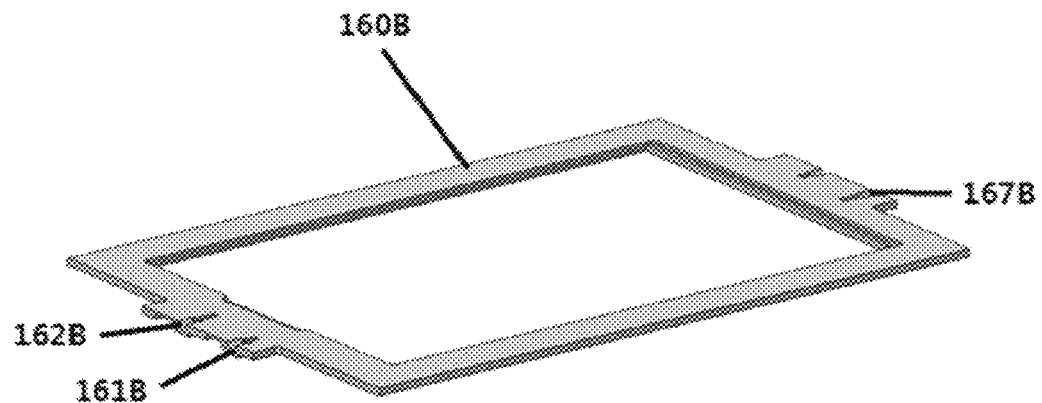
[FIG. 4d]
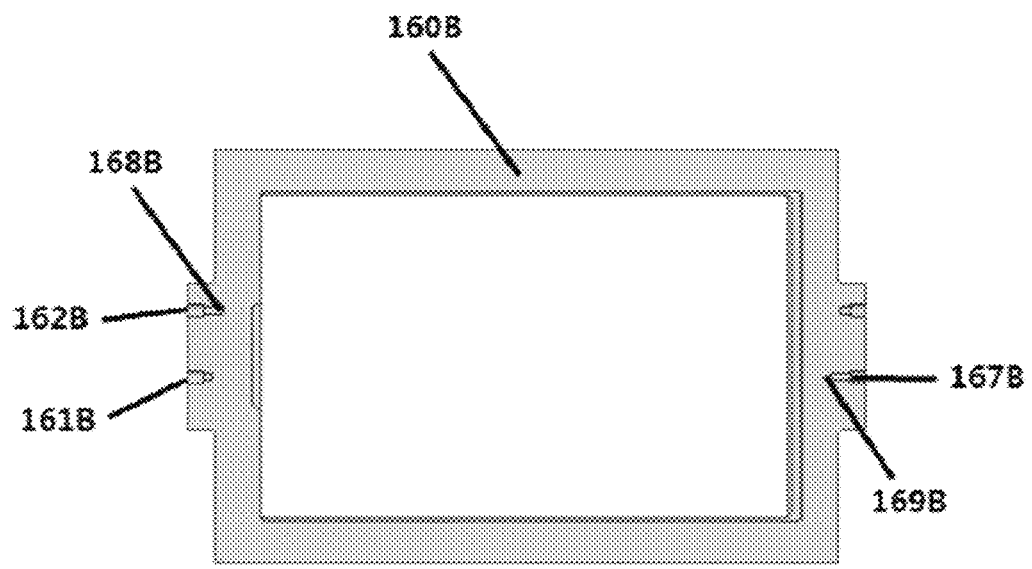

[FIG. 5]
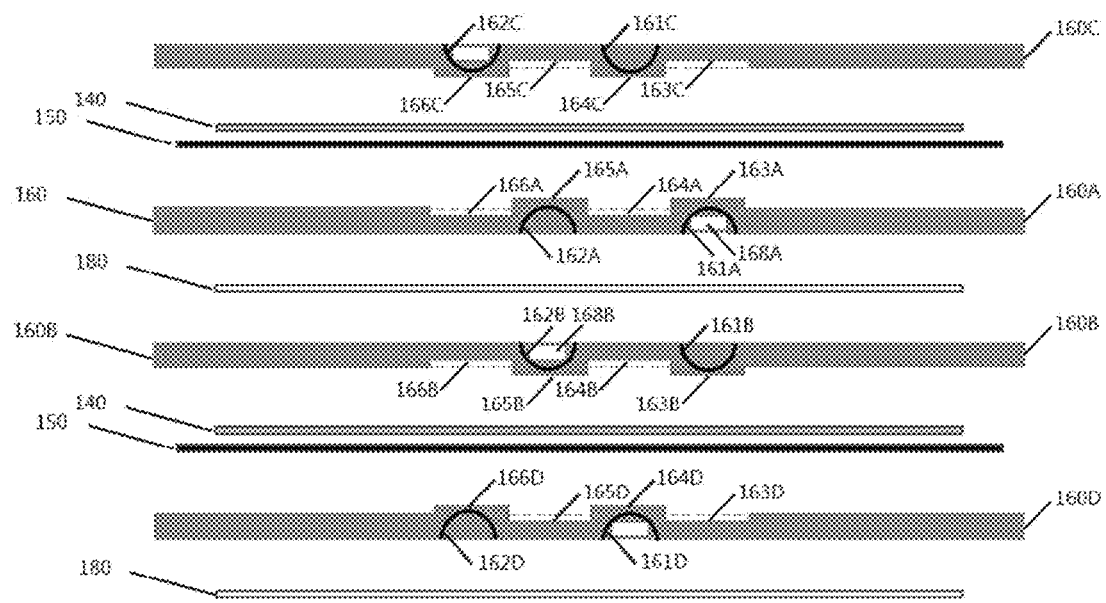
[FIG. 6]
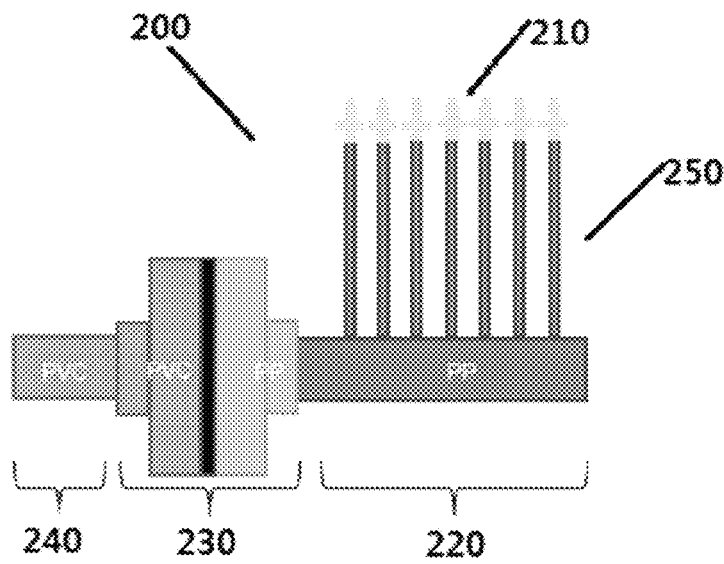

[FIG. 7]
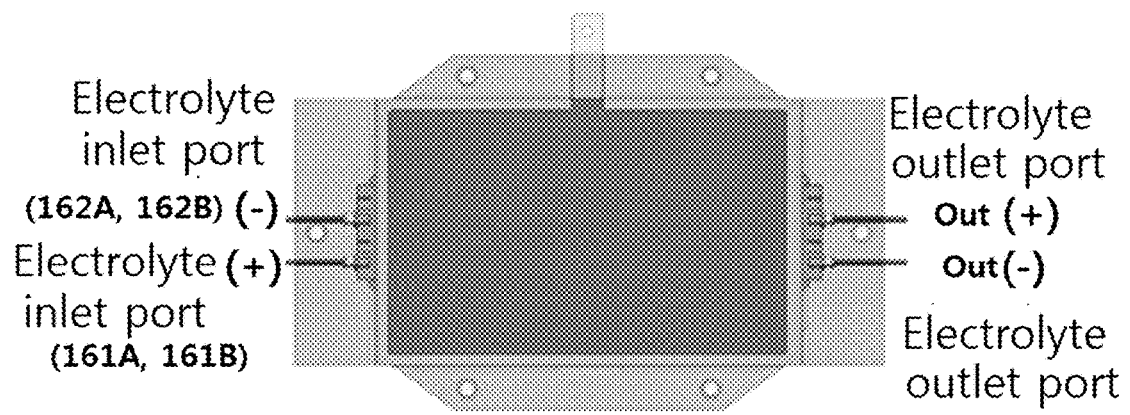
Electrolyte inlet port (162A, 162B) (−)
Electrolyte (+) inlet port (161A, 161B)
Electrolyte outlet port Out (+)
Out(−)
Electrolyte outlet port
[FIG. 8]
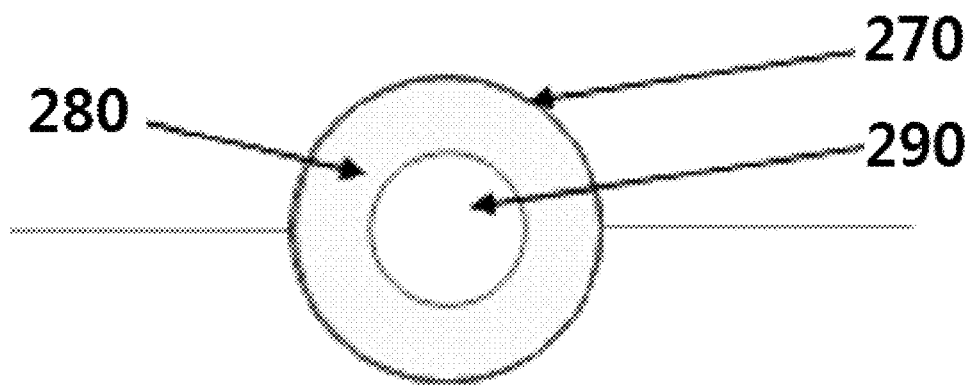

FLOW BATTERY STACK INCLUDING CAPILLARY TUBE

TECHNICAL FIELD

The present invention relates to a redox flow battery stack and more particularly, to a redox flow battery stack to supply an electrolyte to the stack using capillary tubes.

BACKGROUND ART

A redox flow battery is one of core products closely associated with renewable energy, reduction of greenhouse gas, a rechargeable battery and a smart grid, which are attracting the greatest interest in the world in recent years and a product which is rapidly leading to expansion of the market worldwide.

Currently, the human obtains most of its energy from fossil fuels, but there is a problem in that the use of these fossil fuels has serious adverse effects on the environment, such as air pollution and global warming, and low energy efficiency. In order to solve the problems according to the use of the fossil fuels, recently, interest in renewable energy has rapidly increased. Interests and research on such renewable energy are being actively conducted not only in domestic but also worldwide.

The renewable energy market reaches maturity at home and abroad, but there is a problem in that an amount of energy generated is largely changed according to an environmental influence such as time and weather due to the characteristic of the renewable energy. As a result, the supply of an energy storage system (ESS) which stores renewable energy generated is required in order to stabilize development of the renewable energy, and the redox flow battery has attracted attention as the large-capacity energy storage system.

As illustrated in FIG. 1, a general structure of the redox flow battery is constituted by a stack 1 in which cells with electrochemical reaction are stacked, a tank 3 storing an electrolyte, and a pump 4 supplying an electrolyte to the stack from the electrolyte tank.

FIG. 2 illustrates an exploded perspective view of the general stack 1 and illustrates an end plate 11, an insulating plate 12, a current plate 13, a separator 14, a gasket 15, a flow frame 16, an electrode 17, a gasket 15, an ion exchange membrane 18, a gasket 15, an electrode 17, a flow frame 16, a gasket 15, a separator 14, a current plate 13, an insulating plate 12, and an end plate 11, in order from the left side.

Unit cells are formed from the separator 14 to the separator 14 and the gaskets 15 in the stack will be omitted if necessary. In general, one stack is formed by stacking tens to hundreds of unit cells.

The present invention relates to a stack structure capable of supplying an electrolyte using a capillary tube, and in this regard, in U.S. Pat. No. 8,293,390 B2 and US 2011/0206960, there is disclosed a technique capable of supplying an electrolyte to a stack using a capillary tube.

However, in U.S. Pat. No. 8,293,390 B2, an ion exchange membrane (a separator) is deformed by a tube, and in this case, the ion exchange membrane needs to be a material capable of maintaining sealing such as a gasket.

Also, in US 2011/0206960, there is disclosed a method of sealing a connection portion of a capillary tube, but in this case, there is a problem that the connection portion can not be disassembled again.

DISCLOSURE

Technical Problem

The present invention has been made in an effort to supply an electrolyte to a stack using a capillary tube to facilitate assemble and disassemble while solidifying the sealing.

Further, the present invention has been made in an effort to provide a stack having a structure in which an ion exchange membrane is not deformed by a tube, unlike the related prior art.

Technical Solution

An embodiment of the present invention provides a redox flow battery stack including: an ion exchange membrane 180; and flow frames 160A and 160B disposed at both sides of the ion exchange membrane 180, respectively, in which grooves having semicircular cross section are provided on the flow frames 160A and 160B, and the semicircular grooves 161A and 162A of the flow frame 160A are fitted with the semicircular grooves 161B and 162B of the corresponding flow frame 160B during assembly to form at least one of an inlet port and an outlet port.

In addition, a channel 168B placed below the ion exchange membrane may be formed in the flow frame 160B and the channel 168B may be connected to the inlet port formed by the semicircular grooves 162A and 162B of the flow frames 160A and 160B.

In addition, a soft tube may be integrally connected to at least one of the inlet port and the outlet port.

In addition, the soft tube may not be extended into the channel 168B and the ion exchange membrane may not be deformed by the soft tube.

A channel 169B placed below the ion exchange membrane and connected to the outlet port may be further formed in the flow frame 160B, and an electrolyte may pass through the inlet port formed by the semicircular grooves 162A and 162B of the flow frames 160A and 160B, the channel 168B connected to the inlet port, the electrode placed below the ion exchange membrane, and the channel 169B in sequence.

In the flow frame 160A, a channel 168A' (see FIG. 4b) which is placed on the ion exchange membrane and connected to the inlet port formed by the semicircular grooves 161A and 161B may be formed.

In the flow frame 160A, a channel 169A' which is placed on the ion exchange membrane and connected to the outlet port may be further formed, and the electrolyte may pass through the inlet port formed by the semicircular grooves 161A and 161B of the flow frames 160A and 160B, the channel 168A' of the flow frame 160A connected to the inlet port, the electrode placed on the ion exchange membrane, and the channel 169A' of the flow frame 160A connected to the outlet port in sequence.

Protrusions 163A, 165A, 163B, and 165B protruding outside may be formed on opposite sides to the semicircular grooves 161A, 162A, 161B, and 162B of the flow frames 160A and 160B, and the protrusions may be overlapped with concave portions 163C, 165C, 163D, and 165D of the overlapped flow frames 160C and 160D.

The integrally connected soft tube may be connected with an external capillary tube by fitting.

In the flow frames 160A and 160B, the semicircular grooves forming the inlet port or the outlet port may be formed on the portions 168Aa, 169A, 169B, and 169B protruding outside in the rectangular flow frame.

Accordingly, the tube connected to the inlet port or the outlet port needs not to be extended to the ion exchange membrane, and the shape of the ion exchange membrane is not deformed by the tube.

Further, the flow frames 160A and 160B may be integrally formed by solvent welding and the inlet port and the outlet port may maintain circular shapes.

Advantageous Effects

According to the present invention, it is possible to easily assemble and disassemble a capillary tube which supplies an electrolyte to a tube integrally coupled to a flow frame.

Further, it is possible to facilitate sealing because the stack has a structure in which the ion exchange membrane is not deformed.

DESCRIPTION OF DRAWINGS

FIG. 1 is a schematic diagram of a redox flow battery to which the present invention is applied.

FIG. 2 is an exploded perspective view of a redox flow battery stack.

FIGS. 3a and 3b are exploded perspective views of a stack capable of using a capillary tube of the present invention.

FIG. 4a is a perspective view of a frame (160a) in which a lower surface of a flow frame (160A) is viewed based on FIG. 3a.

FIG. 4b illustrates the lower surface of the flow frame (160A) based on FIG. 3a.

FIG. 4c is a perspective view of a flow frame (160B).

FIG. 4d illustrates an upper surface of the flow frame (160B) based on FIG. 3a.

FIG. 5 is a side view of the stack of the present invention.

FIG. 6 illustrates a capillary tube set used in the stack of the present invention.

FIG. 7 is a projective plan view of the stack of the present invention.

FIG. 8 is a cross-sectional view of an electrolyte port.

MODES OF THE INVENTION

Hereinafter, the present invention will be described in more detail with reference to the accompanying drawings.

The accompanying drawings illustrate embodiments of the present invention and are just provided for describing the present invention in more detail, and the technical scope of the present invention is not limited thereto.

FIG. 3a is an exploded perspective view of a stack capable of using a capillary tube of the present invention. Flow frames 160A and 160B are disposed at both sides of an ion exchange membrane 180 and a separator 140 is disposed at an outer side of each of the flow frames. Electrodes 170 are disposed on both sides of the separator in a bonded state.

In the present invention, a capillary tube 250 illustrated in FIG. 6 is connected to the stack to supply an electrolyte to the stack (see FIG. 7).

Accordingly, an inlet port and an outlet port to which the tube may be connected need to be formed in the flow frames 160A and 160B which are disposed at both sides of the ion exchange membrane (see FIG. 7).

As illustrated in FIGS. 3a and 7, the inlet port is formed by matching semicircular grooves 161A and 162A of the flow frame 160A with semicircular grooves 161B and 162B of the flow frame 160B.

In the same manner, the outlet port is formed as illustrated in FIG. 7.

As illustrated in FIG. 3a, the semicircular grooves 161A, 162A, 161B, and 162B forming the inlet port or the outlet port in the flow frames 160A and 160B are formed on portions 160Aa, 160Ab, 160Ba, and 160Bb which protrude outside from a rectangular flow frame.

FIG. 8 illustrates cross sections of the inlet port and the outlet port, and a tube 280 made of a soft material is integrally bonded to an inner surface 270 of the port.

FIG. 6 illustrates a capillary tube 250 to supply the electrolyte to the stack, and the tube 250 is connected to the soft tube 280 illustrated in FIG. 8 using a fitting 210.

The capillary tube 250 is connected to a polypropylene tube 220 and the polypropylene tube is connected to a polyvinyl chloride (PVC) pipe by a flange 230 to form a pipe for circulating the electrolyte.

As illustrated in FIG. 3a, a channel 168B is formed on the upper surface of the flow frame 160B, and the inlet port formed by matching the semicircular groove 162A with the semicircular groove 162B is connected to the channel 168B, and the channel 168B is installed below the ion exchange membrane 180.

FIG. 3b illustrates a configuration in which the channels 168B and 169B of FIG. 3a are covered by the covers 168Ba and 169Ba.

On the other hand, the channel is also formed on the lower surface of the flow frame 160A, and a channel 168A' of the lower surface is connected with the inlet port formed by matching the semicircular groove 161A with the semicircular groove 161B. Further, the channel formed on the lower surface of the flow frame 160A is placed on the ion exchange membrane 180.

As illustrated in FIG. 7, an electrolyte at a cathode side passes through the inlet port formed by matching the semicircular groove 162A and the semicircular groove 162B and the channel 168B and then passes through an electrode disposed below the ion exchange membrane 180. The electrolyte passing through the electrode is discharged to the outlet port formed by a semicircular groove 167B through the channel 169B.

On the other hand, an electrolyte at an anode side passes through the inlet port formed by matching the semicircular groove 161A and the semicircular groove 161B and the channel 168A' formed on the lower surface of the flow frame 160A and placed on the ion exchange membrane. Thereafter, the electrolyte passes through the electrode disposed on the ion exchange membrane and then is discharged through the channel 169A' at the outlet port side formed on the lower surface of the flow frame 160A.

FIG. 4b illustrates the channel 168A' and the channel 169A' on the lower surface of the flow frame 160A based on the perspective view of FIG. 3a, and parts of the channel 168A' and the channel 169A' are covered by the cover described in FIG. 3b.

FIG. 5 is a side view of the stack structure of the present invention, and it can be seen that the inlet port is formed by matching semicircular groove 161A and the semicircular groove 161B and matching the semicircular groove 162A and the semicircular groove 162B in the same manner.

Protrusions 163A, 165A, 163B, and 165B protruding outside are formed on opposite sides to the semicircular grooves 161A, 162A, 161B, and 162B, and the protrusions are overlapped with concave portions 163C, 165C, 163D, and 165D of the overlapped flow frames 160C and 160D.

The protrusions 163A, 165A, 163B, and 165B and the concave portions 163C, 165C, 163D, and 165D are not formed on both sides of a rectangular place of the flow frame where the ion exchange membrane 180 is disposed.

Since the frame 160C and the frame 160A have the same shape, the frame 160C of FIG. 5 is inverted to become the frame 160A. Similarly, since the frame 160D and the frame 160B have the same shape, the frame 160D is inverted to become the frame 160B.

Also, in the present invention, the bonding of the separator 140 and the frames 160A and 160B, the bonding of the ion exchange membrane 180 and the frames 160A and 160B, the tube 280, the inlet port, and the outlet port for inserting the fitting 210 into the frame are made by solvent welding.

Particularly, the frames 160A and 160B are integrally bonded to each other by the solvent welding method, so that the inlet port and the outlet port formed by the frame maintain circular shapes. In the case of using other bonding methods (for example, hot plate welding and ultrasonic welding), deformation such as protruding of welding ribs may be made and thus, the inlet port and the outlet port formed by the two frames may not have the circular shapes.

DESCRIPTION OF REFERENCE NUMERALS
AND SYMBOLS

11: End plate 12: Insulating plate
13: Current plate 14: Separator
15: Gasket 16: Flow frame
16a: Inner empty space of flow frame 16b: Outer frame of flow frame
17: Electrode 18: Ion exchange membrane
140: Separator 160A, 160B: Flow frame

The invention claimed is:

1. A redox flow battery stack, comprising:
an ion exchange membrane (180); and
flow frames (160A,and 160B) disposed at both sides of the ion exchange membrane (180),
wherein grooves having a semicircular section are provided, on the flow frames (160A and 160B),
the semicircular grooves (161A and 162A) of the flow frame (160A) are matched with the semicircular grooves (161B and 162B) of the corresponding flow frame (160B) during assembly to form at least one of an inlet port and an outlet port,
a channel (168B) placed below the ion exchange membrane is formed in the flow frame (160B),
the channel (168B) is connected to the inlet port formed by the semicircular grooves (162A and 162B) of the flow frames (160A and 160B),
a soft tube is integrally connected to at least one of the inlet port and the outlet port, and
the soft tube not extended into the channel (168B) and the ion exchange membrane is not deformed by the soft tube, and
in the flow frames (160A and 160B),the semicircular grooves (161A, 162A, 161B and 162B) forming the inlet port and the outlet port are formed on the portions (160Aa, 160Ab, 160Ba, and 160Bb) protruding outside from a rectangular frame.

2. The redox flow battery stack of claim 1, wherein a channel (169B) placed below the ion exchange membrane is further formed in the flow frame (160B), and an electrolyte passes through the inlet port formed by the semicircular grooves (162A and 162B) of the flow frames (160A and 160B), the channel (168B), the electrode placed below the ion exchange membrane, and the channel (169B) in sequence.

3. The redox battery stack of claim 2, wherein in the flow frame (160A), a channel (168A') which is placed on the ion exchange membrane and connected to the inlet port formed by the semicircular grooves (161A and 161B) is formed.

4. The redox flow battery stack of claim 3, wherein in the flow frame (160A), a channel (169A') which is placed on the ion exchange membrane and connected to the outlet port is further formed, and the electrolyte passes through the inlet port formed by the semicircular grooves (161A and 161B) of the flow frames (160A and 160B), the channel (168A') of the flow frame (160A) connected to the inlet port, the electrode placed on the ion exchange membrane, and the channel (169A') of the flow frame (160A) connected to the outlet port in sequence.

5. The redox flow battery stack of claim 1, wherein protrusions (163A, 165A, 163B, and 165B) protruding outside are formed on opposite sides to the semicircular grooves (161A, 162A, 161B, and 162B) of the flow frames (160A and 160B), and the protrusions are overlapped with concave portions (163C, 165C, 163D, and 165D) of the overlapped flow frames (160C and 160D).

6. The redox flow battery stack of claim 2, wherein protrusions (163A, 165A, 163B, and 165B) protruding outside are formed on opposite sides to the semicircular grooves (161A, 162A, 161B, and 162B) of the flow frames (160A and 160B), and the protrusions are overlapped with concave portions (163C, 165C, 163D, and 165D) of the overlapped flow frames (160C and 160D).

7. The redox flow battery stack of claim 1, wherein the integrally connected tube is connected with an external capillary tube by a fitting.

8. The redox flow battery stack of claim 1, wherein in the flow frames (160A and 160B), the semicircular grooves forming the inlet port or the outlet port are formed on the portions (160Aa, 160Ab, 160Ba and 160Bb) protruding outside in the rectangular flow frame.

9. The redox flow battery stack of Claim 2, wherein the flow frames (160A and 160B) are integrally formed by solvent welding and thereby the inlet port and the outlet port maintain circular shapes.

10. The redox flow battery stack claim 1, wherein a flow frame (160C) placed outside the flow frame (160A) and a flow frame (160D) placed outside the flow frame (160B) are further included,
the frame (160C) and the frame (160A) have the same shape and the frame (160C) is inverted to become the frame (160A), and
the frame (160D) and the frame (160B) have the same shape and the frame (160D) is inverted to become the frame (160B).

* * * * *